May 12, 1931.　　　　J. E. HIGGINS　　　　1,804,983

REVERSING MECHANISM

Filed May 4, 1930　　　2 Sheets-Sheet 1

Witness
C. E. Hunt

Inventor
J. E. Higgins
By H. P. Wilson &co
Attorneys

May 12, 1931. J. E. HIGGINS 1,804,983
REVERSING MECHANISM
Filed May 4, 1930 2 Sheets-Sheet 2
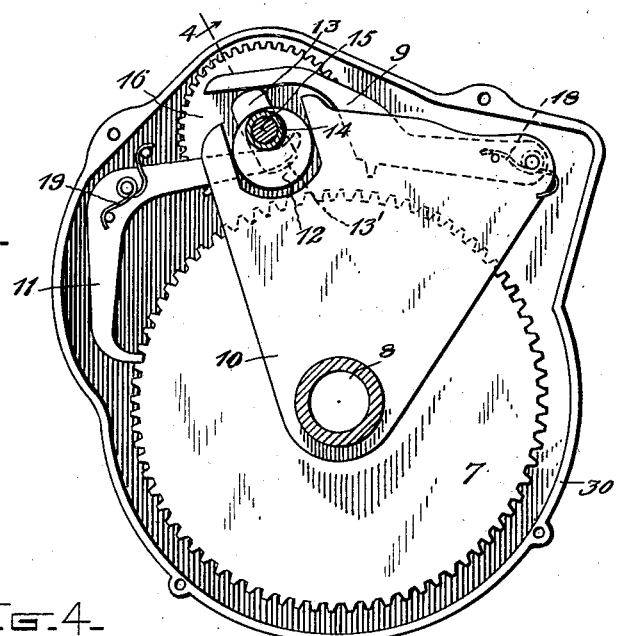
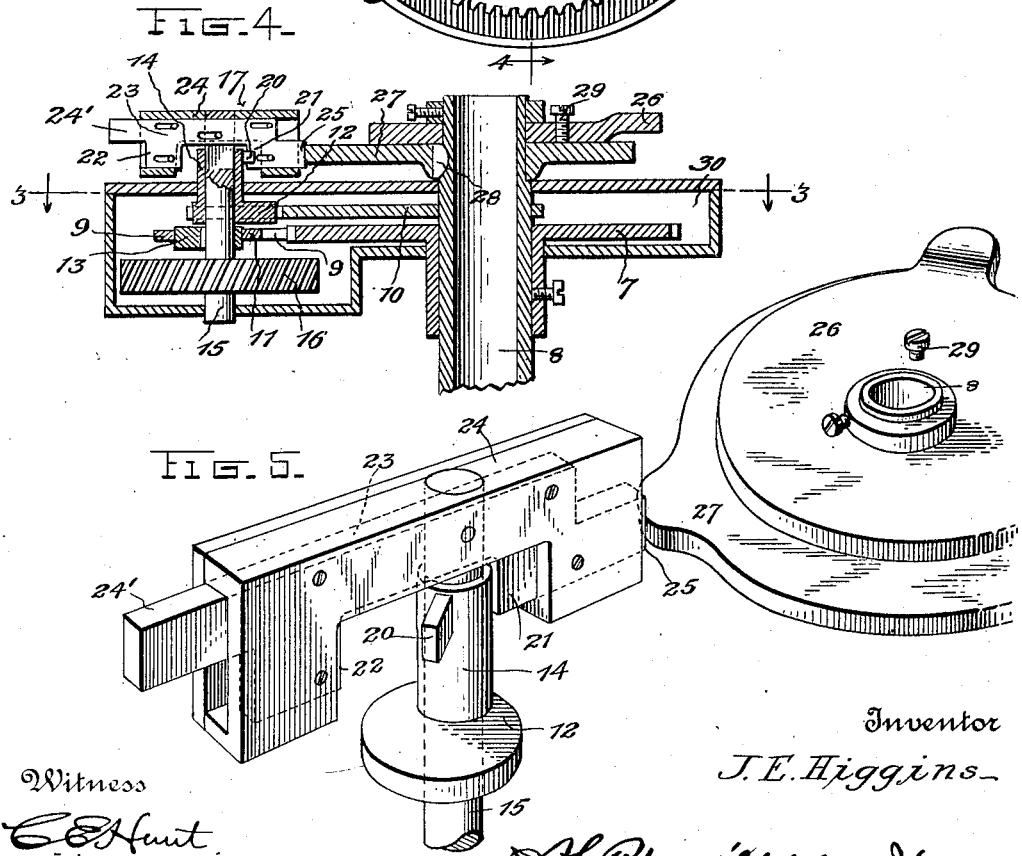
Inventor
J. E. Higgins
By H. R. Willison & Co
Attorneys
Witness
C. E. Hunt Patented May 12, 1931

1,804,983

UNITED STATES PATENT OFFICE

JOSEPH E. HIGGINS, OF GRAND ISLAND, NEBRASKA

REVERSING MECHANISM

Application filed March 4, 1930. Serial No. 433,139.

The invention aims to provide a new and improved mechanism for driving any desired member, first in one direction and then in the other.

For driving the movable member, I make use of a clutch means having a to and fro movement, and rotary means are employed having one off-center part for imparting this movement to the clutch means, said rotary means having another off-center part for controlling engagement and disengagement of said clutch means with said member in timed relation with the proceeding and receding strokes of the former. The two off-center parts have one fixed relation with each other when the movable member is being driven in one direction but must have a different relation when reverse driving is to be effected. Hence, it is a further aim of the invention to make unique provision for relatively adjusting the two off-center parts to obtain the desired ends. With these off-center parts in one relation, the clutch means moves the movable member upon the proceeding strokes of said clutch means but idles upon the receding strokes, whereas when the off-center parts are in their other relation, the proceeding strokes of the clutch means are idle and the receding strokes operate to drive the movable member, provision being thus made for driving said member intermittently in either direction.

A further object of the invention is to provide novel means whereby the length of time which the movable member will be driven in either direction, may be varied as desired.

With the foregoing in view, the invention resides in the novel subject matter hereinafter described and claimed, description being accomplished by reference to the accompanying drawings.

Fig. 3 is a horizontal sectional view as indicated by line 3—3 of Figs. 2 and 4.

Fig. 4 is a vertical sectional view as indicated by line 4—4 of Figs. 1 and 3.

Figs. 5 and 6 are perspective views of parts hereinafter described.

Figure 1:
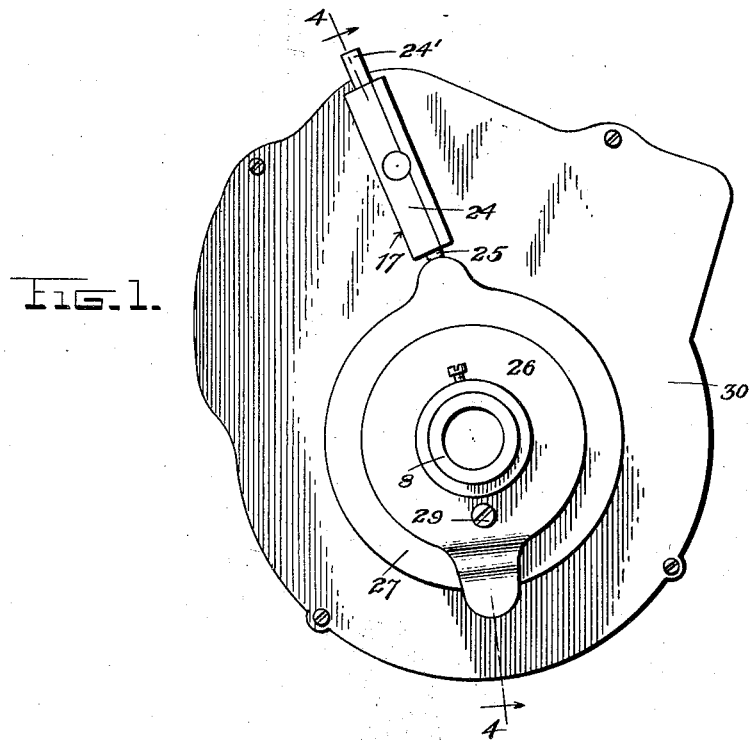
Fig. 1 is a top plan view of a reversing mechanism constructed in accordance with my invention.
Figure 2:
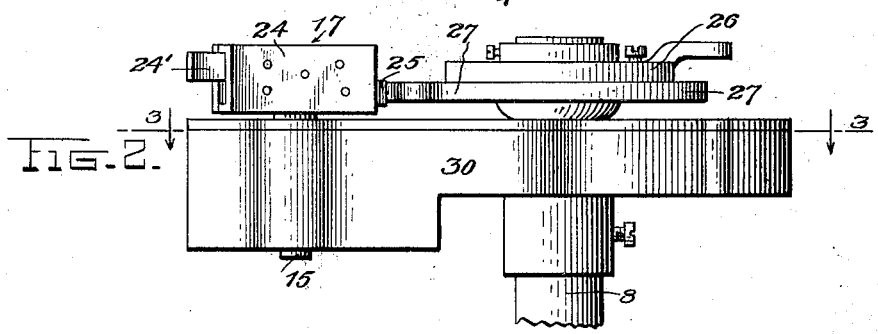
Fig. 2 is a side elevation.
Figure 6:
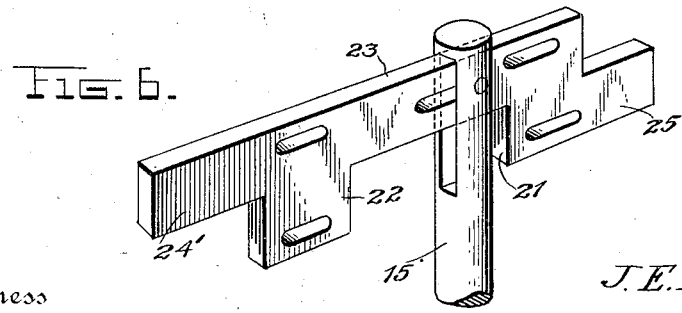

The member to be driven is shown in the form of a peripherally toothed wheel 7 secured to a shaft 8, said shaft being tubular in the present disclosure. Clutch means are provided, adapted for driving the wheel 7 in either direction. In the present showing, the clutch means consists of a pivoted spring-pressed pawl 9 and an oscillator 10 carrying said pawl, said oscillator being pivoted upon the shaft 8. During oscillation of the oscillator 10, the pawl 9 is allowed to engage the teeth of the wheel 7 during either the proceeding or the receding strokes of said oscillator, so as to intermittently drive said wheel 7 in one direction or the other. A spring-pressed pawl 11 is shown for holding the wheel 7 against accidental movement during the idle strokes of the pawl 9, but frictional or other provision could of course be made for this purpose.

Rotatable means are provided having one off-center part 12 for operating the oscillator 10 and causing to and fro stroking on the part of the pawl 9, said rotatable means being provided with a second off-center part 13 for controlling engagement and disengagement of the pawl 9 with the wheel 7, in timed relation with the proceeding and receding movements of the oscillator 10. In the present showing, the part 12 is an eccentric upon a tubular shaft 14, and the part 13 is a cam on a drive shaft 15 which extends through the tubular shaft 14. Any appropriate means may be provided for driving the shaft 15, a portion of such a driving means being indicated at 16, in the form of a gear. The shaft 15 is adapted to drive the shaft 14 and connecting means are provided between these two shafts, said connecting means being indicated in a general way by the number 17. This connecting means is operable to vary the existing relation between the eccentric 12 and the cam 13 to effect engagement of the pawl 9 with the wheel 7 during either the proceeding or receding movements of said pawl and the oscillator 10 by which it is carried. Hence, the wheel 7 may be intermittently driven in one direction or the other, In the preferred construction, means hereinafter described, are provided for automatically controlling the connecting means 17 so as to reverse the direction in which wheel 7 is driven, at the end of any desired period of operation.

In the present showing, movement of the pawl 9 into and out of engagement with the wheel 7, and movement of the dog 11 into and out of engagement with said wheel, are both controlled by the single cam 13. The parts are so related that by the time the pawl 9 is in readiness to engage the wheel 7, the cam 13 will release the dog 11, allowing said wheel to turn, whereas when pawl 9 is disengaged from the wheel by the cam 13, dog 11 engages said wheel to hold it. The spring 18 of the pawl 9 and the spring 19 of the dog 11, both act in a direction to engage said pawl and dog with the wheel 7, and disengagement is effected by the cam 13. When one relation exists between the off-center parts 12—13, pawl 9 engages and dog 11 disengages the wheel 7 upon each proceeding stroke of the oscillator 10, whereas with said off-center parts in their other relation, pawl 9 engages and dog 11 disengages the wheel 7 upon the receding strokes of the oscillator. Adjustment of the off-center parts 12 and 13 into either of these two relations, if effected in a manner which can be better explained after describing the construction of the connecting means 17.

The tubular shaft 14 is provided with a lateral projection 20 which is co-operable with either of two abutment portions 21—22 on a shiftable abutment or slide 23. This member 23 is slidably mounted in an appropriate guide 24 rigidly carried by the drive shaft 15, and the relation of its abutment portions 21—22, is such that when one of these portions is positioned to strike the projection 20 to drive the shaft 14, the other of said portions is in a position to clear said projection. When abutment 21 is in engagement with lug 20 as seen in Fig. 4, the eccentric 12 and cam 13 have the relation illustrated in Fig. 3, but when the slide 23 is shifted to free the projection 20 from engagement with the abutment portion 21 and to dispose the abutment portion 22 in position to strike said projection 20, the relation of the parts 12 and 13 will be changed, for the shaft 15 will make one-half revolution before the abutment portion 22 engages the lug 20, and consequently the cam 13 secured to said shaft will then be in the position shown by dot and dash lines in Fig. 3. This changing of the relations of the off-center parts 12 and 13, conditions the mechanism for driving the wheel in one direction or the other, as may be desired.

The ends of the slide 23 are provided with two control portions 24' and 25 respectively, positioned to travel in different planes as the shaft 15 rotates. These control portions 24' and 25 are co-operable with two cams 26 and 27 respectively, which are driven by the shaft 8. These cams effect shifting of the slide 23 first in one direction and then in the other to control the reversing of the mechanism. Assuming that cam 27 has just engaged and shifted the slide 23, as shown in Figs. 4 and 5, the wheel 7 and shaft 8 will be intermittently driven in one direction, until cam 26 moves into the annular path of the control portion 24'. Then, portion 24' strikes cam 26 and consequently the slide 23 is shifted to its reversed position, freeing the projection 20 and allowing the eccentric 12 to remain stationary until the shaft 15 has made a half revolution. Thus, the relation between the eccentric 12 and the cam 13 is reversed and consequently shaft 8 and wheel 7 will be reversely driven.

Provision is made for relatively adjusting the cams 26 and 27 to vary the time which the wheel 7 will be driven in either direction. In the present showing, cam 27 is keyed at 28 or otherwise secured to the shaft 8, whereas cam 26 may be turned upon said shaft and locked in any desired adjustment by a set screw 29.

A preferred construction has been illustrated, in which most working parts are housed within an appropriate casing 30 which also forms means for mounting a number of said parts in proper relation with each other. It is to be understood however that in some mechanisms, the operating parts might well be exposed and that any desired provision could be made for maintaining the proper relation between elements.

While the operation of the mechanism could probably be understood from the foregoing, it may be well to describe it in detail. The shaft 15 is driven and through the instrumentality of the projection 20, slide 23 and guide 24, said shaft drives the tubular shaft 14. Thus, both the cam 13 and the eccentric 12 are driven and it may be assumed that they then bear the relation shown in full lines in Fig. 3. Thus, each time the oscillator 10 is moved in one direction by the eccentric 12, the pawl 9 engages the wheel 7 and dog 11 is disengaged from said wheel by the cam 13, and when the end of the movement in said one direction has been completed, cam 13 frees the dog 11 and disengages the pawl 9 from the wheel 7, so that during the return stroke of the oscillator 10, pawl 9 will idle and wheel 7 will be held by the dog 11. These operations are repeated until the wheel 7 has turned the shaft 8 a sufficient distance to bring the cam 26 in the path of the control portion 24' of the slide 23. When this occurs, the slide is shifted to free the projection 20 from the abutment portion 21 of the slide and to position the abutment portion 22 for co-action with said projection 20. Shaft 15 now makes half a revolution before the abutment portion 22 engages the projection 20 and again drives the tubular shaft 14. This rotation of shaft 15 with respect to shaft 14, reverses the relation of the cam 13 with the eccentric 12, said cam then occupying the position shown by dotted lines 13' in Fig. 3. Hence, pawl 9 will be disengaged from the wheel 7 and dog 11 engaged with said wheel during the strokes of the oscillator 10 in which said pawl 9 was previously engaged with and said dog 11 disengaged from said wheel 7. Reverse movement of the latter is thus effected and such reverse movement will continue until cam 27 has been moved into the path of the control portion 25, whereupon the mechanism will again be restored to its original condition for driving in the first described direction.

The present disclosure illustrates and describes one of many ways of carrying the invention into effect, and while it may be considered that I have disclosed the preferred construction, it is to be also understood that within the scope of the invention as claimed, numerous variations may be made.

I claim:—

1. A reversing mechanism comprising a movably mounted member, clutch means adapted for driving said member in one direction or the other, rotary means having one off-center portion for imparting proceeding and receding movements or strokes to said clutch means, said rotary means having a second off-center portion for controlling engagement and disengagement of said clutch means with said member in timed relation with the strokes of said clutch means, and means for effecting relative adjustment of said off-center portions about the axis of said rotary means to cause clutch engagement upon either the proceeding or receding strokes of said clutch means.

2. A reversing mechanism comprising a movably mounted member, clutch means adapted for driving said member in one direction or the other, rotary means having one off-center portion for imparting proceeding and receding movements or strokes to said clutch means, said rotary means having a second off-center portion for controlling engagement and disengagement of said clutch means with said member in timed relation with the strokes of said clutch means, and means controlled by the movement of said member for effecting automatic relative adjustment of said off-center portions about the axis of said rotary means to cause clutch engagement upon either the proceeding or receding strokes of said clutch means.

3. A reversing mechanism comprising a movably mounted member, clutch means adapted for driving said member in one direction or the other, two co-axial rotary members one of which is adapted to be continuously driven, an off-center part carried by one of said rotary members for imparting proceeding and receding movements or strokes to said clutch means, a second off-center part carried by the other of said rotary members for controlling engagement and disengagement of said clutch member with said movably mounted member in timed relation with the strokes of said clutch means, and means for operatively connecting said rotary members with each other in one relative position or another to vary the relation of said off-center parts and cause clutch engagement upon either the proceeding or receding strokes of said clutch means.

4. A reversing mechanism comprising a movably mounted member, clutch means adapted for driving said member in one direction or the other, two co-axial rotary members one of which is adapted to be continuously driven, an off-center part carried by one of said rotary members for imparting proceeding and receding movements or strokes to said clutch means, a second off-center part carried by the other of said rotary members for controlling engagement and disengagement of said clutch member with said movably mounted member in timed relation with the strokes of said clutch means, and means controlled by the movement of said movable member for operatively connecting said rotary members with each other in one relative position or another to vary the relation of said off-center parts and cause clutch engagement upon either the proceeding or receding strokes of said clutch means.

5. A reversing mechanism comprising a movably mounted member, clutch means adapted for driving said member in either direction, two co-axially mounted rotary members, one of said co-axial members being adapted to be continuously driven, an off-center part carried by one of said co-axial members for imparting proceeding and receding movements or strokes to said clutch means, a second off-center part carried by the other of said co-axial members for controlling engagement and disengagement of said clutch means with said movably mounted member in timed relation with the proceeding and receding strokes of said clutch means, means for operatively connecting said co-axial members with each other in one relative position or another to vary the relation of said off-center parts and cause clutch engagement upon either the proceeding or receding strokes of said clutch means, and means driven by said movably mounted member for controlling said connecting means.

6. A reversing mechanism comprising a movably mounted member, clutch means adapted for driving said member in either direction, two coaxially mounted rotary members, one of said co-axial members being adapted to be continuously driven, an off-center part carried by one of said co-axial members for imparting proceeding and receding movements or strokes to said clutch means, a second off-center part carried by the other of said co-axial members for controlling engagement and disengagement of said clutch means with said movably mounted member in timed relation with the proceeding and receding strokes of said clutch means, means for operatively connecting said co-axial members with each other in one relative position or another to vary the relation of said off-center parts and cause clutch engagement upon either the proceeding or receding strokes of said clutch means, said connecting means having two control portions adapted for operation to dispose said connecting means in either of its operative positions respectively, and two cams driven by said movably mounted member for operating said control portions respectively.

7. A structure as specified in claim 6; together with means whereby said cams may be relatively adjusted to control the length of time which said movably mounted member will be driven in either direction.

8. A reversing mechanism comprising a movably mounted member, clutch means adapted for driving said member in either direction, a driving shaft, a second shaft coaxial therewith, an off-center part carried by one of said shafts for imparting proceeding and receding movements or strokes to said clutch means, a second off-center part carried by the other of said shafts for controlling engagement and disengagment of said clutch means with said movably mounted member in timed relation with the proceeding and receding strokes of said clutch means, a projection on said second shaft, a shiftable abutment carried by the drive shaft and having two abutment portions at opposite sides of the axis of said shafts, either of said abutment portions being co-operable with said projection in operatively connecting the two shafts, said shiftable abutment being provided also with two control portions at opposite sides of said axis, and two cams driven by said movably mounted member and co-operable with said control portions for shifting said shiftable abutment to alternately position its two abutment portions for co-action with said projection, thereby causing alternate setting of the aforesaid off-center parts to effect driving of said movably mounted member alternately in opposite directions.

9. In a mechanism of the class described, two co-axial members one of which is adapted to be continuously driven, said members having off-center parts, connecting means for said members embodying means for operatively connecting them and for disconnecting them, and means actuated by said off-center parts for controlling said connecting means to alternately apply and release the same, thereby varying the relation of said off-center parts.

10. In a mechanism of the class described, two co-axially mounted members one of which is adapted to drive the other, a projection on said other member, and a shiftable abutment mounted on the driving member and having abutment portions at opposite sides of the axis of said members, either of said abutment portions being adapted for co-action with said projection in operatively connecting the two members.

11. In a mechanism of the class described, two co-axially mounted members one of which is adapted to drive the other, a projection on said other member, a shiftable abutment mounted on the driving member and having abutment portions at opposite sides of the axis of said members, either of said abutment portions being adapted for co-action with said projection in operatively connecting the two members, said shiftable abutment being also provided with control portions at opposite sides of the aforesaid axis, and means actuated by said co-axial members for co-action with said control portions to shift said shiftable abutment and alternately position its abutment portions for co-action with said projection.

12. In a mechanism of the class described, a drive shaft, a tubular shaft surrounding said drive shaft and having a projection at one end, and a slide mounted on and disposed diametrically of said drive shaft at said end of the tubular shaft, said slide having abutments at opposite sides of said drive shaft either of which is adapted to co-act with said projection to operatively connect the two shafts.

13. In a mechanism of the class described, a drive shaft, a tubular shaft surrounding said drive shaft and having a projection at one end, a slide mounted on and disposed diametrically of said drive shaft at said end of the tubular shaft, said slide having abutments at opposite sides of said drive shaft either of which is adapted to co-act with said projection to operatively connect the two shafts, the ends of said slide being provided with control portions positioned to travel in different planes as the drive shaft rotates, and means co-operable with said control portions to alternately shift said slide in opposite directions, thereby alternately bringing its abutments into co-operative relation with said projection.

14. In a mechanism of the class described, two co-axially mounted members one of which is adapted to drive the other, a projection on said other member, a shiftable abutment mounted on the driving member and having abutment portions at opposite sides of the axis of said members, either of said abutment portions being adapted for co-action with said projection in operatively connecting the two members, said shiftable abutment being also provided with control portions at opposite sides of the aforesaid axis, cams co-operable with said control portions respectively to shift said shiftable abutment, and means for relatively adjusting said cams to control the length of time which the movable member will be driven in either direction.

In testimony whereof I have hereunto affixed my signature.

JOSEPH E. HIGGINS.